(12) United States Patent
Crowley, Jr.

(10) Patent No.: US 7,628,185 B2
(45) Date of Patent: Dec. 8, 2009

(54) DIPPER STICK CUTTER

(76) Inventor: John Crowley, Jr., 2828 Keech Rd., Branchport, NY (US) 14418

( * ) Notice: Subject to any disclaimer, the term of this patent is extended or adjusted under 35 U.S.C. 154(b) by 604 days.

(21) Appl. No.: 11/350,572

(22) Filed: Feb. 9, 2006

(65) Prior Publication Data
US 2007/0180740 A1 Aug. 9, 2007

(51) Int. Cl.
*A01G 23/087* (2006.01)
(52) U.S. Cl. ............... 144/4.1; 144/34.1; 144/34.5; 30/134; 30/228; 241/101.71
(58) Field of Classification Search ............... 144/4.1, 144/34.1, 34.5; 30/134, 228; 241/101.71, 241/101.72, 101.73, 101.74, 266
See application file for complete search history.

(56) References Cited

U.S. PATENT DOCUMENTS

| | | | |
|---|---|---|---|
| 3,865,160 A * | 2/1975 | McColl | 144/4.1 |
| 3,972,097 A | 8/1976 | Schakat | |
| 4,543,719 A | 10/1985 | Pardoe | |
| 4,669,187 A | 6/1987 | Pardoe | |
| 4,771,540 A | 9/1988 | LaBounty | |
| 4,913,203 A * | 4/1990 | Lessard | 144/34.5 |
| 5,142,779 A | 9/1992 | LaBounty | |
| 5,826,339 A | 10/1998 | Price | |
| 5,926,958 A | 7/1999 | Ramun | |
| 6,047,475 A * | 4/2000 | Tyrrell et al. | 30/134 |
| 6,662,836 B1 * | 12/2003 | Andersen | 144/34.5 |
| 6,994,284 B1 * | 2/2006 | Ramun | 241/266 |

* cited by examiner

*Primary Examiner*—Shelley Self
(74) *Attorney, Agent, or Firm*—Brown & Michaels, PC

(57) ABSTRACT

A tree and brush cutter is attached to a dipper stick of an excavator or backhoe to be operated by a curl cylinder on the dipper stick. Blades on the cutter face the boom side of the dipper stick where an operator can observe their opening and closing. A link system on the cutter transmits an advancing motion of the curl cylinder into a cutting motion of the blades and a retraction motion of the curl cylinder to opening of the blades.

19 Claims, 9 Drawing Sheets

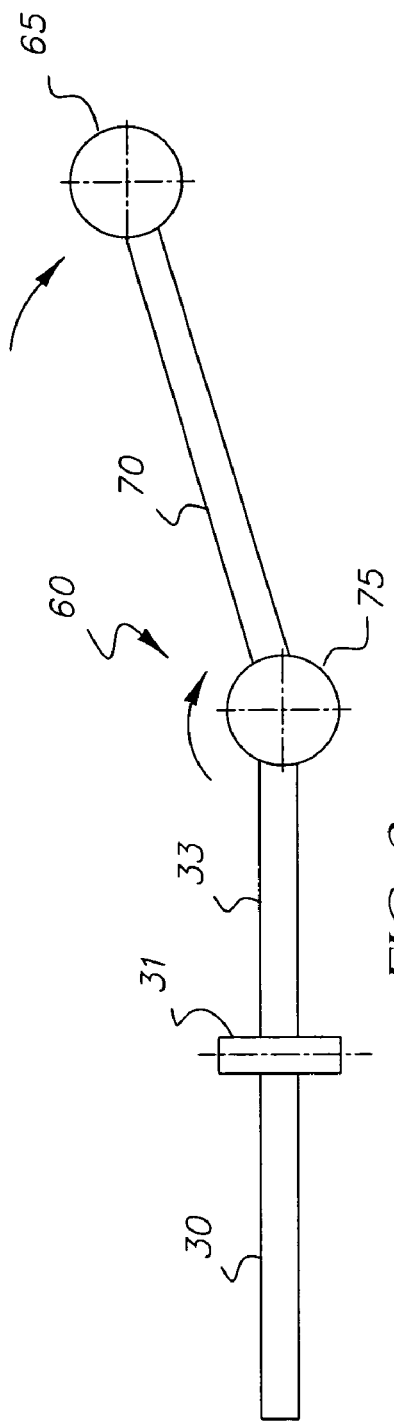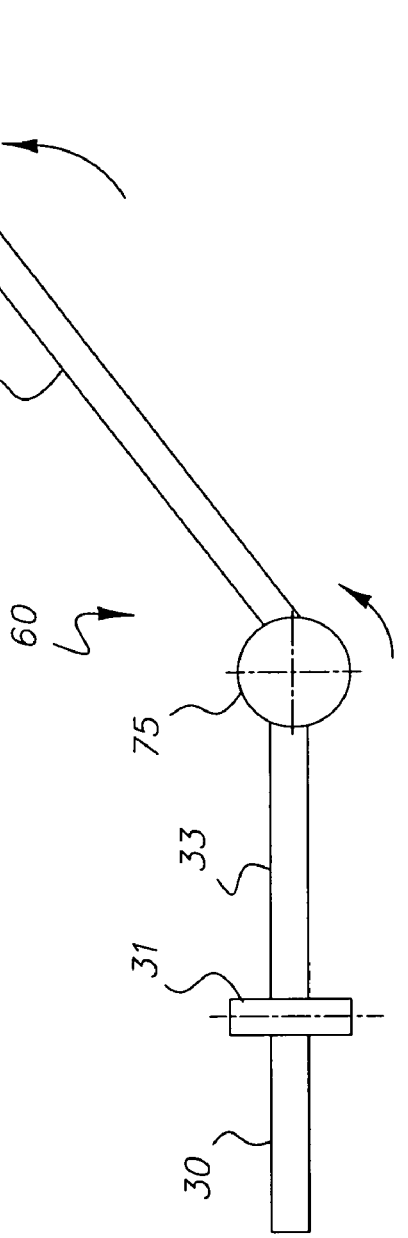

DIPPER STICK CUTTER

FIELD OF THE INVENTION

The invention pertains to the field of tools attachable to dipper sticks of excavators and backhoes.

BACKGROUND

This invention recognizes a need for an improved way of cutting trees and brush along rural roadsides, under power lines, and in other areas that need to be cleared. Trees and brush are presently cleared using crews wielding chain saws and brush chippers, which is expensive, dangerous, and slow. Roadside brush is also sometimes cut with rotary mower blades that fling debris dangerously and leave a chopped and messy appearance. Also, such rotary cutters cannot cut trees close to the ground.

SUMMARY

This invention aims at faster and more efficient cutting of trees and brush by using a wood cutter attached to the dipper stick of an excavator or backhoe. The cutter includes a pair of blades that are operated by the curl cylinder on the dipper stick, without requiring any additional hydraulic circuitry. The inventive cutter can be pinned in a conventional way to the end of a dipper stick of an excavator or backhoe and then can be operated quickly and conveniently by the curl cylinder to cut trees and brush rapidly and efficiently.

The advantages of the invention include reducing the number of workers and increasing their safety in clearing trees and brush, and improving the efficiency of tree and brush clearing by speeding up the work pace. The invention also aims at clean cuts and neat appearance of tree and brush trimming, and eliminating hazards such as flying debris or chain saw accidents. The invention also takes advantage of the versatility and efficiency of excavators and backhoes in not only rapidly cutting trees and brush, but in being able to move them into convenient position for chipping or loading.

DRAWINGS

FIGS. 1 and 2 schematically illustrate an excavator equipped with the inventive cutter for cutting a top or branch from a tree in FIG. 1, and for cutting off a tree near its base in FIG. 2.

FIGS. 8 and 9 are schematic side views of the link system of FIGS. 6 and 7 showing a closed blade position in FIG. 8 and an open blade position in FIG. 9.

DETAILED DESCRIPTION

Figure 1:
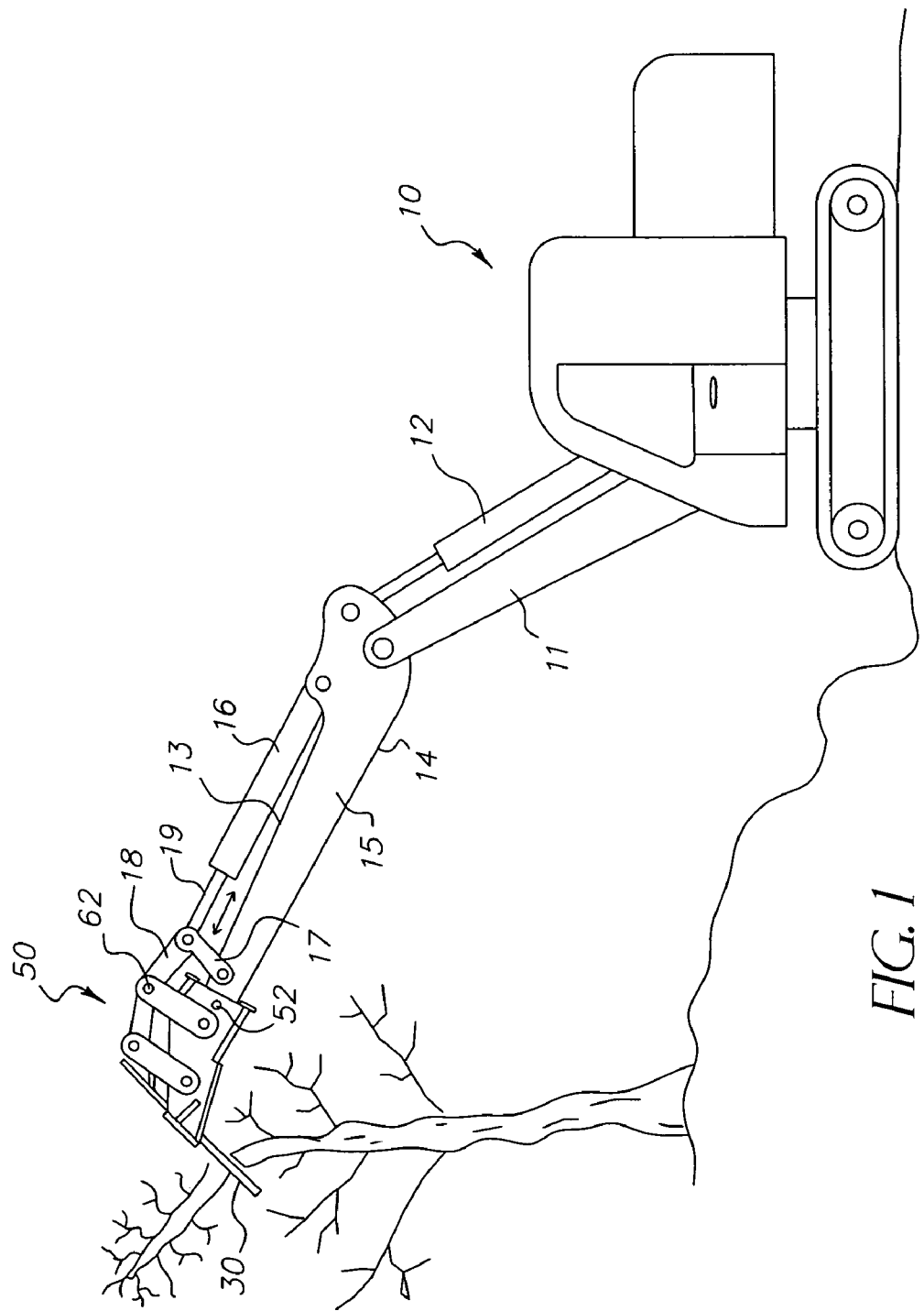
Figure 2:
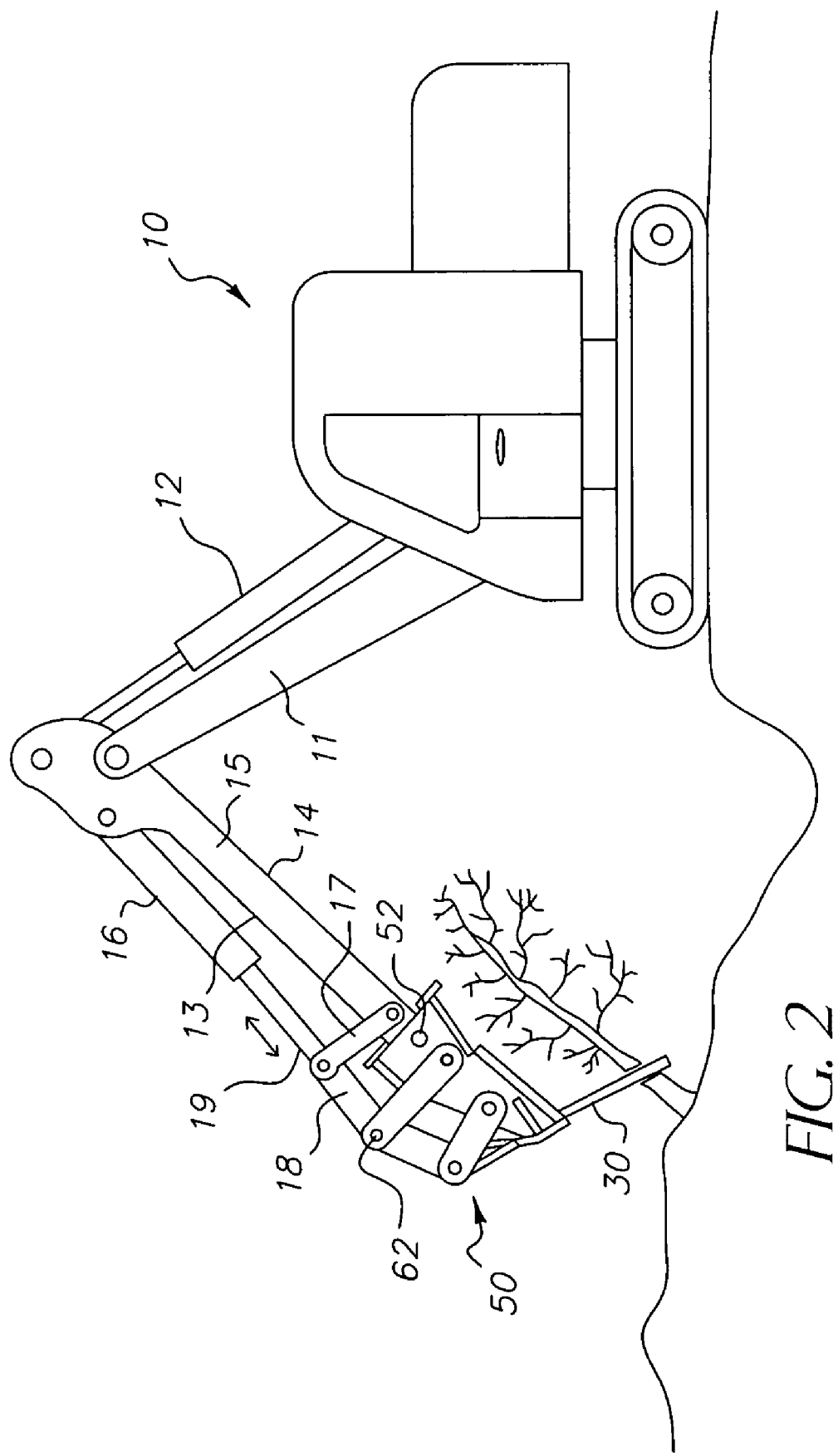

FIGS. 1 and 2 illustrate two of the available cutting positions of the inventive cutter 50 mounted on a dipper stick 15 of an excavator 10. A boom 11 and a dipper stick cylinder 12 work to position dipper stick 15 which includes a curl cylinder 16 that operates cutter 50. Any excavator or backhoe can be fitted with a suitably sized cutter 50 for cutting trees and brush. Smaller machines equipped with smaller size cutters 50 will be suitable for cutting brush and trees up to a few inches in diameter, and larger cutters 50 on larger machines will be able to cut wood up to six or more inches in diameter. Cutter 50 is not intended for use in cutting trees large enough to produce saw logs, as this generally requires tree gripping and maneuvering mechanisms.

Dipper stick 15 has a boom side 14 and a curl cylinder side 13, and cutter 50 has blades 30 that are oriented to cut on the boom side 14 of dipper stick 15. This puts the action of cutter 50 where an operator of machine 10 can best observe the proper positioning and cutting action desired. Curl cylinder 16 moves to extend and retract, as indicated by the double headed arrow, and this movement is transmitted to cutter 50, which translates the movement into open and closed positions of cutting blades 30.

FIG. 1 illustrates how machine 10 can reach upward with a dipper stick 15 and operate cutter 50 to cut a top or limb from a tree. FIG. 2 illustrates how dipper stick 15 and cutter 50 can be maneuvered to cut a tree near its base. In some situations, cutter 50 can remove the top of a tree with a cut such as illustrated in FIG. 1, and then can be maneuvered down to the base of the topped tree to make a second cut near the ground. In other words, by first topping a tree to be removed, dipper stick 15 can then reach down from above the topped tree to cut it off near the ground.

It is also possible to operate cutter 50 so as to pinch and seize a cut piece of wood and move it to a place convenient for chipping. The same blades 30 that cut wood can also bite part-way into a piece of wood and thereby hold it while it is lifted and moved. Additionally, cutter 50 can be moved laterally by pivoting machine 10 or boom 11 to sweep material toward a convenient spot for chipping.

A conventional excavator or backhoe 10 does not have to be modified to operate cutter 50. The same curl cylinder 16 that operates buckets and other attachments connects to cutter 50 and provides all the force and motion necessary for cutting operation. The movements required of an operator of machine 10 to make cutter 50 work are similar to the movements required to make a bucket work. For example, curl cylinder control and movement necessary to make a bucket curl while digging and lifting is the same movement needed to make cutter 50 cut. Conversely, the same movement that uncurls a bucket to dump or deposit a bucket-full of material is the movement needed to open cutter 50. This makes control of cutter 50 ergonomically familiar and convenient to an operator of machine 10.

A conventional part of dipper stick 15 is a pivot 17 mounted near the distal end of dipper stick 15 and connected to curl cylinder 16. Linear motion of shaft 19 of curl cylinder 16 is converted to an arcuate motion by pivot 17, and this motion is transmitted to cutter 50 by connector 18. The same arrangement is used for buckets and other appliances attachable to dipper sticks. The arrangement allows different dimensions of attachments to accommodate buckets and other appliances of various shapes.

Figure 3:
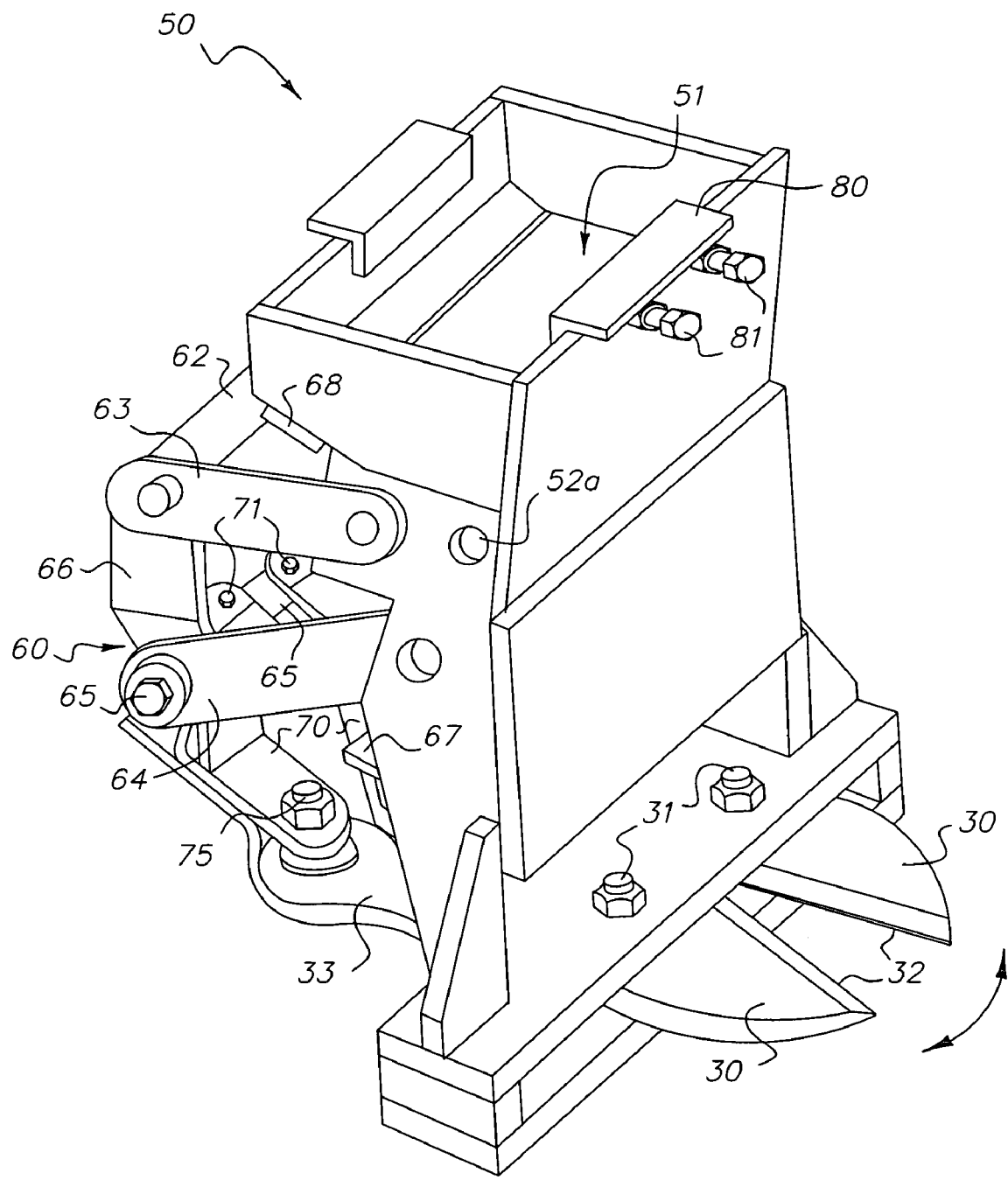
FIG. 3 is an isometric oblique view of the cutter of FIGS. 1 and 2 shown detached from a dipper stick.
Figure 4:
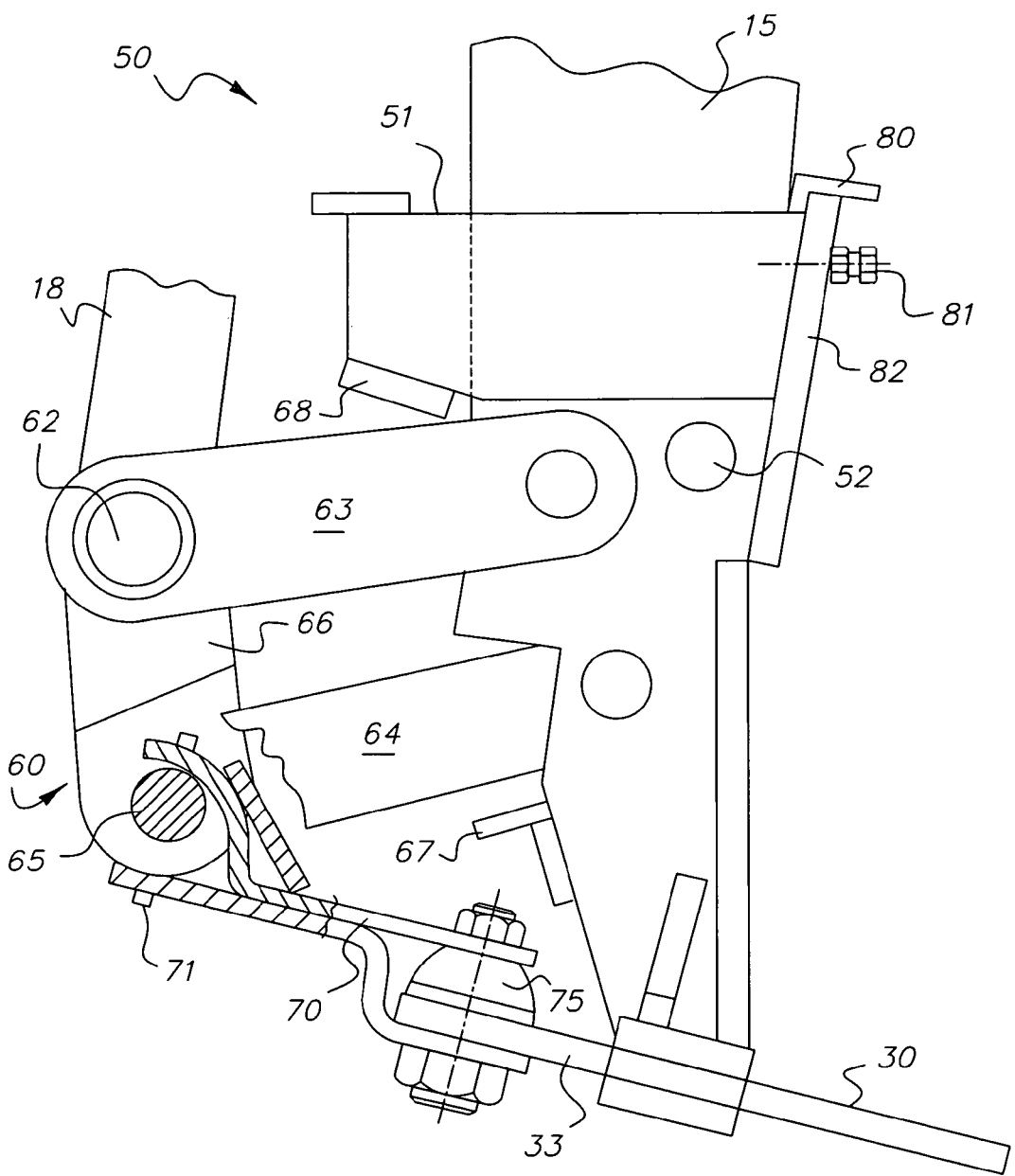
FIG. 4 is a partially cut-away side elevational view of the cutter of FIG. 3 attached to a dipper stick.

Cutter 50 is attached to dipper stick 15 in the same way that a bucket or other appliance is attached to dipper stick 15. This is best seen by comparing FIGS. 1 and 2 with FIGS. 3 and 4. A bare dipper stick is inserted down into cutter 50 through open top 51, and attachment pin 52 then fits through holes 52A to pin ears of dipper stick 15 to cutter 50. This is the same way that a bucket is pinned to the end of dipper stick 15.

Connector 18 is then connected to cutter link system 60 by pin 62. This is the same way that connector 18 is pinned to a bucket to make the bucket curl and uncurl.

Cutter link system 60 transmits movement of curl cylinder 16 received via connector 18 to open and close a pair of cutting blades 30. These preferably have separate blade pivots 31 around which blades 30 can pivot between open and closed positions. Cutting edges 32 of blades 30 are made hard enough and tough enough to perform their wood cutting work for many hours without needing replacement.

Cutter link system 60 includes a pair of upper or actuator pivot arms 63 moved by actuator pin 62 in response to connector 18 moved by curl cylinder 16. The generally vertical arcuate movement of actuator pin 62 on pivot arms 63 is transmitted downward by a pair of connector arms 66 to link bar 65, which also moves in a generally vertical arcuate motion on link or pivot arms 64. As curl cylinder 16 advances and retracts along dipper stick 15 it moves actuator bar 62 up and down via connector 18 and moves link bar 65 up and down via connector arms 66.

The generally vertical arcuate motion of link bar 65 is transmitted by link arms 70 to open and close cutting blades 30. Since blades 30 are preferably angled by more than 90 degrees from an axis of dipper stick 15, link arms 70 are preferably connected to blades 30 and link bar 65 by universal joints.

The preferred angle between cutter blades 30 and an axis of dipper stick 15 is from about 100 degrees to about 140 degrees. This requires the generally vertical motion applied to link bar 65 to be transmitted to an opening and closing motion of blades 30 in a plane that is oblique by 100 degrees or more from the vertical action of link bar 65.

To accomplish the universally jointed connections that are preferred for link arms 70, the upper ends of link arms 70 connect to link bar 65 by pivot pins 71 that allow each link bar 70 to rotate around a connector pin 71. Since link bar 65 is preferably freely rotatable on its axis, pivot pins 71 allow limited universal pivotal motion between link arms 70 and link bar 65.

The lower end of link bars 70 are preferably connected to cutter blades 30 via ball joints 75, which also provide a limited range of universal pivotal motion between link arms 70 and blades 30. A stop 67 limits downward movement of link system 60, and another stop 68 limits upward movement of link system 60. Such stops can be positioned in many places besides the ones illustrated. The necessary travel of curl cylinder 16 to actuate link system 60 and operate cutter blades 30 is only a few inches, preferably on the order of 3-7 inches. This allows blades 30 to open wide enough to straddle wood up to about 8 inches in diameter, depending on the size of machine 10 and cutter 50.

Figure 5:
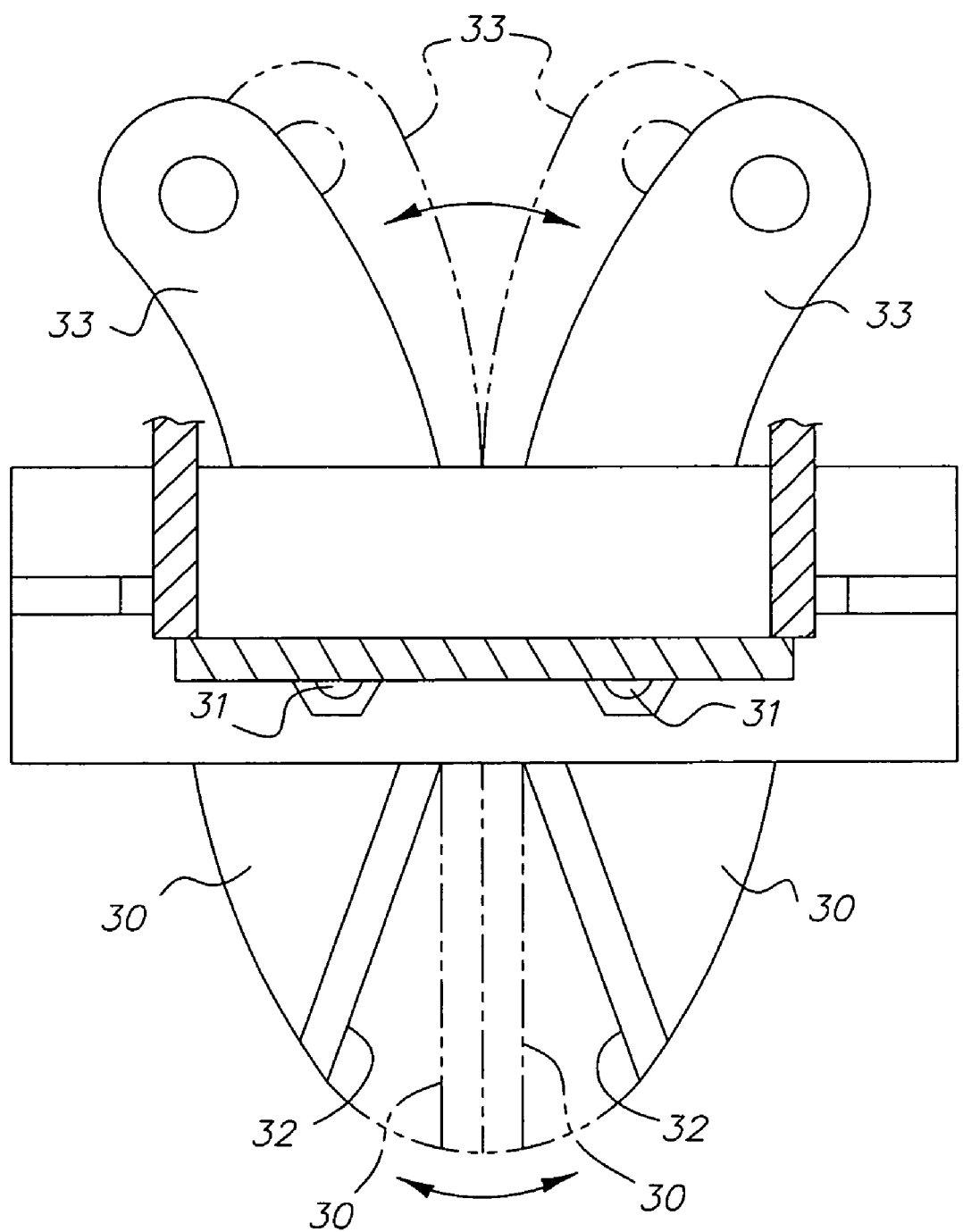
FIG. 5 is a fragmentary and partially cutaway plan view of the cutter blades of the cutter of FIG. 1 shown in solid lines in an open position and in broken lines in a closed position.

The open position of cutter blades 30 is illustrated in solid lines in FIG. 5, and the corresponding closed position of blades 30 is shown in broken lines. Blade arms 33 move apart as blades 30 open, and move toward each other when blades 30 close. It is also possible to arrange blades 30 on a common pivot to operate in a by-pass shearing mode. If the link system for transmitting curl cylinder movement to such blades remains similar to what is illustrated in the drawings, the single blade pivot would reverse the action of the opening and closing movements, and this is presently not preferred.

Figure 6:
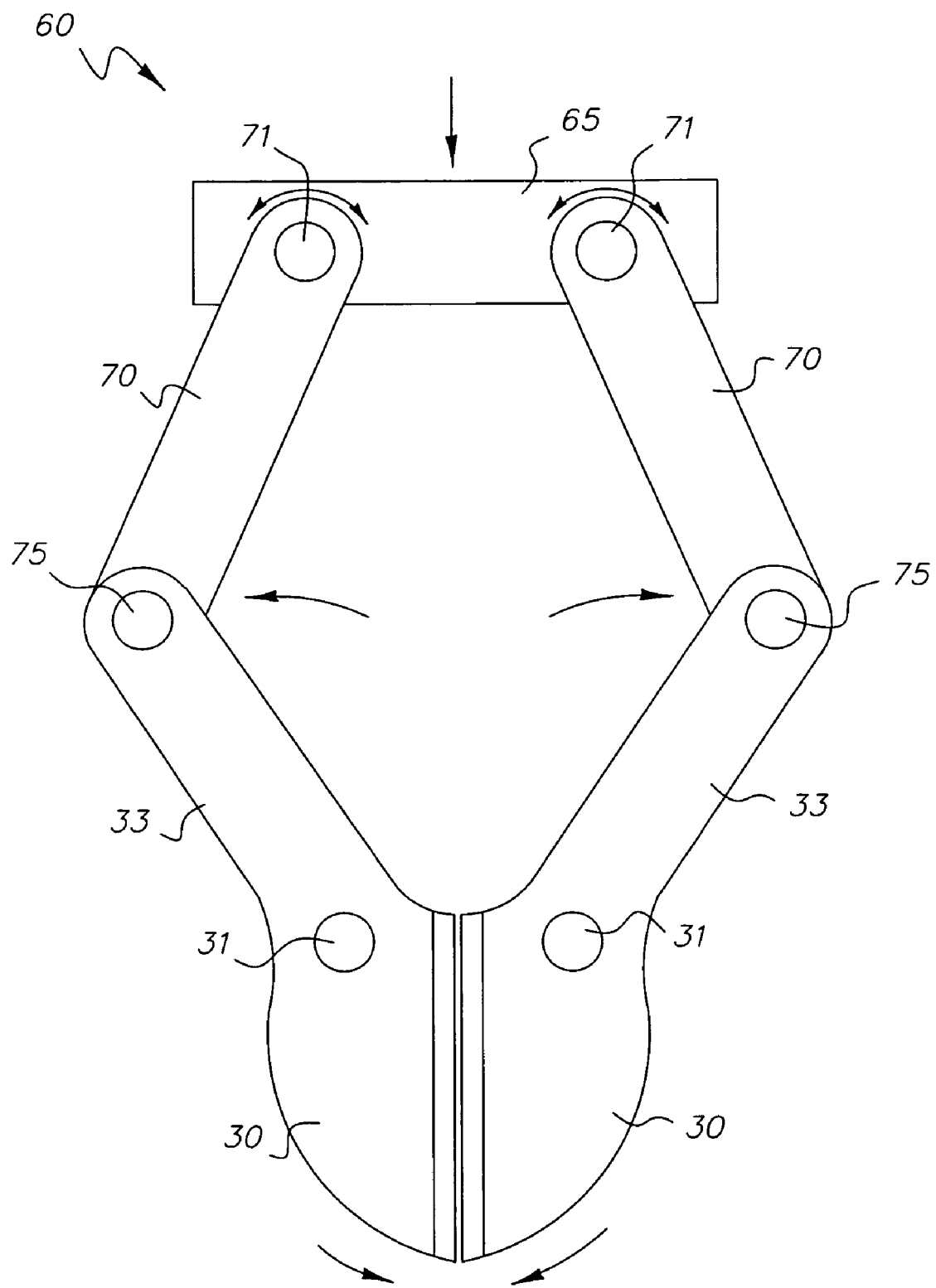
FIGS. 6 and 7 are schematic views of the cutter blades of FIG. 5 and a link system that moves the blades to a closed cutting position in FIG. 6 and in an open position in FIG. 7.
Figure 7:
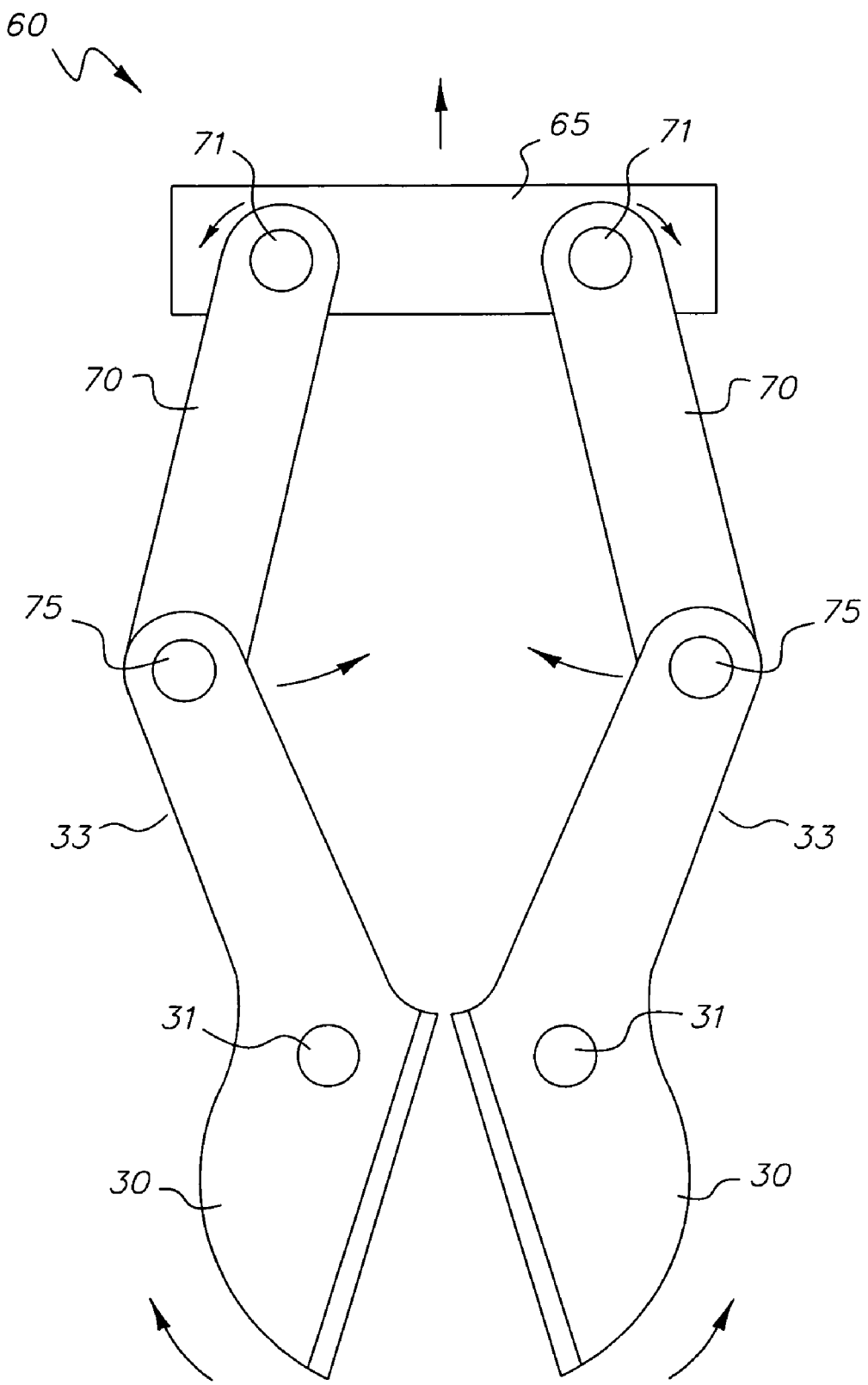

The way the link system 60 accomplishes the opening and closing of blades 30 is best illustrated schematically in FIGS. 6-9. Seen from above, the motion between link bar 65 and blades 30 resembles frog legs. When link bar is pulled up, as shown in FIG. 7, it lifts link arms 70, which link bar 65 allows by being freely pivotal. As link arms 70 lift, they pull back from blade pivots 31 and thus draw ball joints 75 toward each other on blade arms 33. This opens blades 30 and pivots link arms 70 toward each other, which is permitted by pivot pins 71 attaching link arms 70 to link bar 65 and by ball joints 75 attaching link arms 70 to blade arms 33. When link bar 65 moves down, as shown in FIG. 6, it approaches blade pivots 31, which requires link arms 70 to spread apart and move blade arms 33 apart. This moves blades 30 together for a cut. Again, such movement is permitted by the rotation of link bar 65 and link arm pins 71 and by ball joint 75.

The schematic side views of link system 60 as shown in FIGS. 8 and 9 respectively corresponds with the schematic plan views of FIGS. 6 and 7. Blades 30 are closed in FIG. 8, link bar 65 is pressed downward and toward blade pivots 31, and blade arms 33, and links 70 are foreshortened. When link bar 65 is pulled up and away from blade pivots 31, as shown in FIG. 9, then blades 30 are open and appear foreshortened while blade arms 33 and link arms 70 are not foreshortened. Ball joints 75 and the pivoting connections of link arms 70 to rotatable link bar 65 permits the illustrated movements, as previously described. The closing blade movements shown in FIGS. 6 and 8 occur during extension of curl cylinder 16, which is familiar to a machine operator as making a bucket curl. This makes cutting with blades 30 ergonomically analogous to digging with a bucket. Conversely, the open blade position illustrated in FIGS. 7 and 9 is caused by retraction of curl cylinder 16 and is ergonomically familiar to a machine operator as a bucket dumping motion. This helps an experienced machine operator quickly adapt to the movements and controls necessary for efficiently operating cutter 50.

Figure 10:
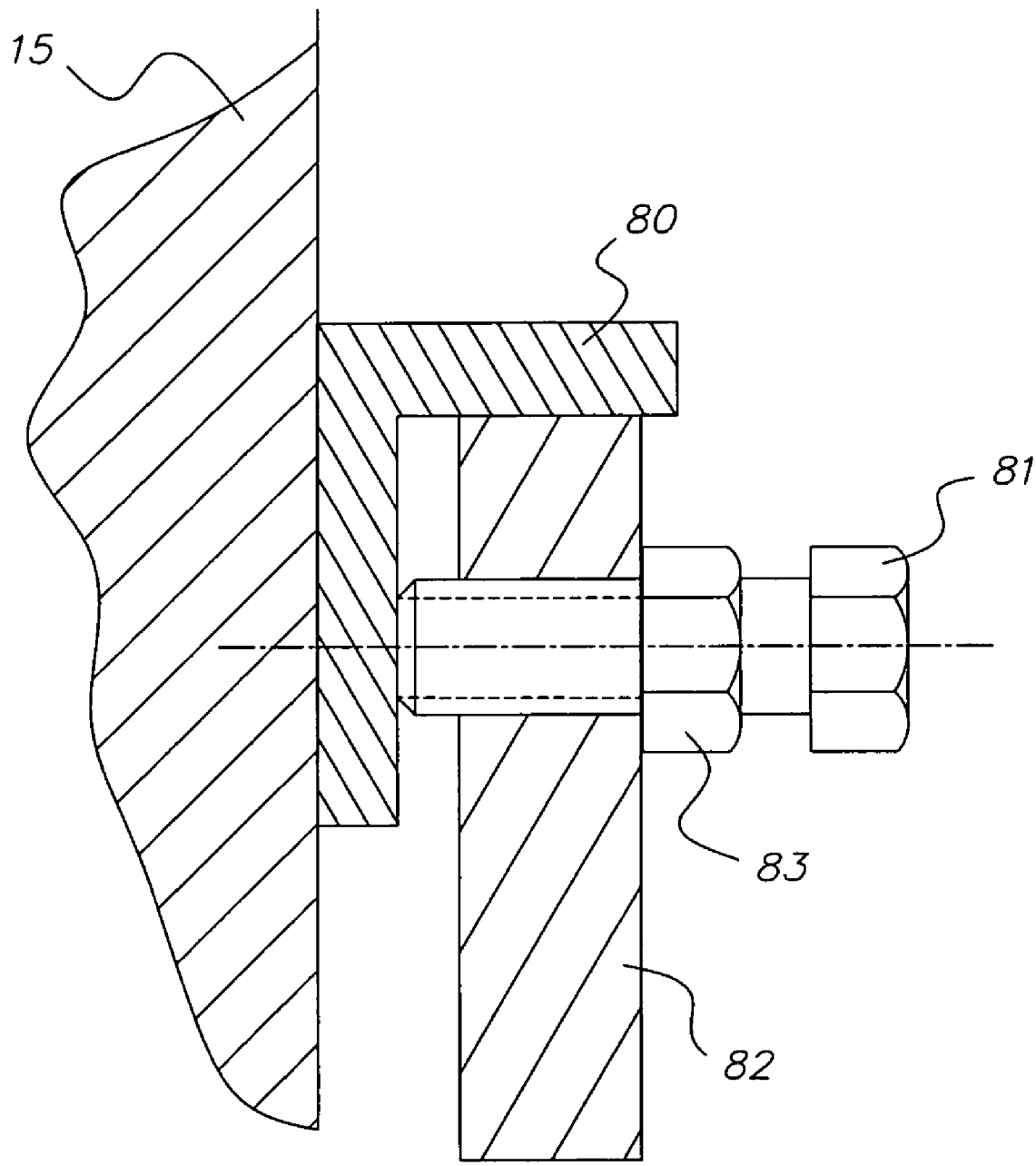
FIG. 10 is a fragmentary cross-sectional view of a clamp system for positioning the cutter of FIGS. 3 and 4 snuggly against a dipper stick.

Since dipper sticks 15 come in many sizes and shapes and are sometimes dented or dinged, a clamping shim 80, as illustrated in FIG. 10, is preferably pressed against the boom side of dipper stick 15 by jammed lock bolts 81. Bolts 81 are preferably tapped through top plate 82 so that they can screw against shim 80 and press shim 80 against dipper stick 15. Bolts 81 are held securely in place by jamb nuts 83. This, and many other possible arrangements of shims, wedges, and jamb nuts can take up any slack that remains when cutter 50 is pinned to dipper stick 15. The goal is to remove any rattle, jiggle, or relative movement between cutter 50 and dipper stick 15, once it is pinned and shimmed in place.

What is claimed is:

1. A cutter attachable to a dipper stick of an excavator or backhoe, the dipper stick having a boom side and a curl cylinder side opposite each other and being movable in a generally vertical plane, and the cutter comprising:
   a pair of cutting blades pivotally movable to open and close in a plane transverse to the generally vertical plane;
   cutting edges of the blades being oriented to face toward the boom side of the dipper stick;
   a pair of links connected respectively to the pair of blades to move the blades open and closed for cutting; and
   the links being arranged to move the blades in response to movement of a curl cylinder on the curl cylinder side of the dipper stick.

2. The cutter of claim 1 wherein movement of the curl cylinder in a first direction opens the blades, and movement of the curl cylinder in a second direction closes the blades.

3. The cutter of claim 1 wherein the links include a link attached to each blade by a universal joint.

4. The cutter of claim 3 wherein the links are pivotally connected to a rotatable link bar that moves in response to the curl cylinder.

5. The cutter of claim 1 wherein an actuator is moved in an arc by the curl cylinder, a rotatable link bar is moved in an arc by a connection to the actuator, and the links are pivotally connected to the link bar and respectively connected to the blades via universal joints.

6. The cutter of claim 5 including a pair of stops positioned to limit arcuate movement of the link bar.

7. The cutter of claim 1 wherein the blades have separate and spaced apart pivots.

8. A wood cutter combinable with a dipper stick of an excavator or back hoe having a hydraulically operated curl cylinder on the dipper stick, the cutter comprising:
   a pair of cutting blades pivotally movable to open and close in a plane transverse to a generally vertical plane of movement of the dipper stick;
   cutting edges of the blades being oriented to face toward a boom side of the dipper stick;
   a link arm connected to each blade via a universal joint;
   the link arms being pivotally connected to a freely rotatable link bar; and
   motion of the curl cylinder in the generally vertical plane of the dipper stick being transmitted to the link bar so that an extending motion of the curl cylinder pushes the link bar toward the blades, causes the link arms to spread apart at connections between the link arms and the blades and moves the blades to a closed position effecting a cut, and so that a retracting motion of the curl cylinder pulls the link bar away from the blades, causes the link arms to move toward each other at connections between the link arms and the blades and moves the blades to an open position.

9. The cutter of claim 8 including an arcuately movable actuator moved by the curl cylinder, the actuator being operatively connected to the link bar to move the link bar in an arcuate motion.

10. The cutter of claim 8 including stops limiting the arcuate motion of the link bar.

11. The cutter of claim 8 including separate and spaced apart pivots for the blades.

12. A dipper stick cutter operable by a curl cylinder on a dipper stick on which the cutter can be mounted, the cutter comprising:
   a pair of pivotally mounted cutting blades that are movable to an open position to straddle wood to be cut and are movable to a closed position to cut wood;
   cutting edges of the blades being oriented to face toward a boom side of the dipper stick;
   a link system adapted to transmit extending and retracting motion of the curl cylinder to operate the blades when the cutter is mounted on the dipper stick;
   the link system including a pair of link arms connected respectively to the blades via universal joints;
   the link arms being pivotally connected to a link bar;
   an activator adapted to move in response to the curl cylinder; and
   movement of the activator being transmitted to the link bar to move the link arms to open and close the blades for cutting.

13. The dipper stick cutter of claim 12 wherein the link bar is freely rotatable.

14. The dipper stick cutter of claim 12 wherein movement of the link bar toward the blades spreads apart the link arm connections to the blades and closes the blades for cutting and movement of the link bar away from the blades pulls together the link arm connections to the blades and opens the blades.

15. The dipper stick cutter of claim 12 wherein the link bar moves toward and away from the blades in an arcuate path, and the blades move open and closed in a plane oblique to the arcuate path.

16. A dipper stick cutter blade and link system operating a pair of pivotally mounted dipper stick cutter blades, the combination of the link system and the cutter blades comprising:
   cutting edges of the blades being oriented to face toward a boom side of the dipper stick;
   a link bar rotatable in response to movement of a dipper stick curl cylinder;
   a pair of link arms connected respectively to the link bar so that each of the link arms can pivot relative to the link bar;
   the link arms being respectively connected to the cutter blades by a pair of ball joints;
   the link bar being arcuately movable toward and away from the cutter blades; and
   during arcuate movement of the link bar, the link arms pivot relative to the link bar to spread apart the ball joint connections of the link arms to the cutter blades to pivot the blades to one position as the link bar pushes toward the blades, and to move the ball joint connections of the link arms to the blades toward each other to pivot the blades to a second position as the link bar pulls away from the blades.

17. The link system of claim 16 wherein the cutter blades open and close in a plane oblique to the arcuate movement of the link bar.

18. The link system of claim 16 wherein a push and pull motion of the link bar toward and away from the cutter blades moves the blades between closed and open positions in a plane oblique to the push-pull motion of the link bar.

19. The link system of claim 16 wherein the cutter blades are mounted respectively on a pair of spaced apart pivots so that as the ball joint connection of the link arms to the blades is spread apart, the blades close to cut, and as the ball joint connection of the link arms to the blades move toward each other, the blades open.

* * * * *

UNITED STATES PATENT AND TRADEMARK OFFICE
CERTIFICATE OF CORRECTION

PATENT NO. : 7,628,185 B2
APPLICATION NO. : 11/350572
DATED : December 8, 2009
INVENTOR(S) : John Crowley, Jr.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Second Day of November, 2010

David J. Kappos
*Director of the United States Patent and Trademark Office*